(12) United States Patent
Fang et al.

(10) Patent No.: US 11,731,895 B2
(45) Date of Patent: Aug. 22, 2023

(54) CUTTING METHOD AND CUTTING MACHINE TABLE FOR CUTTING SUBSTRATE

(71) Applicant: HKC CORPORATION LIMITED, Shenzhen (CN)

(72) Inventors: Ping Fang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 213 days.

(21) Appl. No.: 17/210,525

(22) Filed: Mar. 24, 2021

(65) Prior Publication Data
US 2022/0033293 A1 Feb. 3, 2022

(30) Foreign Application Priority Data
Jul. 30, 2020 (CN) .......................... 202010751259.5

(51) Int. Cl.
*C03B 33/03* (2006.01)
*C03B 33/07* (2006.01)

(52) U.S. Cl.
CPC .............. *C03B 33/03* (2013.01); *C03B 33/07* (2013.01)

(58) Field of Classification Search
CPC ....... C03B 33/03; C03B 33/07; C03B 33/033; C03B 33/076; C03B 33/037; B65G 2249/04

USPC ............................................................. 83/23
See application file for complete search history.

(56) References Cited

U.S. PATENT DOCUMENTS

| | | | | |
|---|---|---|---|---|
| 5,475,196 A | * | 12/1995 | Lisec | C03B 33/078 225/93.5 |
| 5,927,582 A | * | 7/1999 | Duecker | B65H 35/10 225/2 |
| 8,011,546 B2 | * | 9/2011 | Ueyama | B28D 5/0082 225/96 |
| 8,621,738 B2 | * | 1/2014 | Iwamoto | G02F 1/133351 29/284 |

FOREIGN PATENT DOCUMENTS

| | | | |
|---|---|---|---|
| CN | 103288342 A | 9/2013 | |
| CN | 204265634 U | 4/2015 | |
| CN | 106467356 A | 3/2017 | |
| JP | 3194224 U | * 11/2014 | ................ G01F 1/13 |
| JP | 3202191 U | * 1/2016 | ............. C03B 33/03 |

* cited by examiner

*Primary Examiner* — Ghassem Alie

(57) ABSTRACT

The present application discloses a cutting method and a cutting machine table for cutting a substrate, where the cutting method includes following steps: cutting a large substrate to be cut to obtain a finished substrate falling on a second cutting machine table; after the cutting, driving the second cutting machine table according to a preset parameter to enable a driving-away height difference to be formed between the second cutting machine table and the first cutting machine table; driving the second cutting machine table away from the first cutting machine table; and resetting the second cutting machine table to an initial state.

13 Claims, 8 Drawing Sheets

CUTTING METHOD AND CUTTING MACHINE TABLE FOR CUTTING SUBSTRATE

The present application claims priority to the Chinese Patent Application No. 202010751259.5, filed Jul. 30, 2020, which is hereby incorporated by reference herein as if set forth in its entirety.

TECHNICAL FIELD

The present application relates to technical field of substrate manufacturing, and in particular, to a cutting method and a cutting machine table for cutting a substrate.

BACKGROUND

The statements herein merely provide background information related to the present application and do not necessarily constitute the conventional art.

The substrate manufacturing process mainly includes: manufacturing the array substrate and the color film substrate; sealing the array substrate and the color film substrate, and filling a liquid crystal material between the two substrates; integrally assembling the display module is to form a substrate module; placing the sealed array substrate and color filter substrate on a cutting machine table, and cutting and splitting the sealed product.

In the process of cutting and splitting, the large substrate on the cutting table is generally incompletely split after cut by the cutting wheel due to insufficient penetration of the cutting wheel, therefore causing tears at the edges of the circuit board when the substrate is driven away, leading to abnormality of the quality of the substrate.

SUMMARY

The purpose of the present application is to provide a cutting method and a cutting machine table for cutting a substrate, and to solve the problem of quality abnormality caused by directly driving the substrate away without sufficient cutting penetration.

The present application discloses a cutting method for cutting a substrate including following steps:

placing a large substrate to be cut on a first cutting machine table and a second cutting machine table of a cutting machine table;

adjusting a cutting apparatus to a cutting position of the substrate to be cut, and cutting the large substrate to be cut to obtain a finished substrate falling on the second cutting machine table;

driving the second cutting machine table according to a preset parameter after the cutting to enable a driving-away height difference to be formed between the second cutting machine table and the first cutting machine table;

driving the second cutting machine table away from the first cutting machine table to drive the finished substrate obtained by cutting away from the large substrate; and transferring the finished substrate obtained by cutting to a specified position, and resetting the second cutting machine table to an initial state.

The present application also discloses a cutting method for cutting a substrate including following steps:

placing a large substrate to be cut on a first cutting machine table and a second cutting machine table of a cutting machine table;

adjusting a cutting apparatus to a cutting position of the substrate to be cut corresponding to the position between the first cutting machine table and the second cutting machine table;

driving a Z-axis screw rod by a drive module to lift an end of the second cutting machine table close to the first cutting machine table according to a first angle parameter to enable a cutting inclination angle to be formed between the second cutting machine table and the first cutting machine table;

cutting the large substrate to be cut to obtain a finished substrate falling on the second cutting machine table; driving the Z-axis screw rod by the drive module to lift the end of the second cutting machine table close to the first cutting machine table according to a second angle parameter after the cutting, so that a splitting inclination angle is formed between the second cutting machine table and the first cutting machine table to split the substrates;

obtaining a split finished substrate falling on the second cutting machine table after the splitting;

driving the Z-axis screw rod by a drive module to lift the end of the second cutting machine table close to the first cutting machine table according to a third angle parameter to enable a driving-away inclination angle to be formed between the second cutting machine table and the first cutting machine table; and transferring the finished substrate obtained by cutting to a specified position with a grabbing apparatus, and resetting the second cutting machine table to an initial state by the cutting machine table.

The present application also discloses a cutting machine table including a first cutting machine table, a second cutting machine table, a driving apparatus, a cutting apparatus and a grabbing apparatus, with the second cutting machine table being aligned with the first cutting machine table, and the first cutting machine table and the second cutting machine table being used for supporting a substrate to be cut. When in an initial state, the second cutting machine table is horizontally aligned with the first cutting machine table, the driving apparatus includes a Z-axis screw rod and a drive module, the Z-axis screw rod is arranged below the end of the second cutting machine table close to the first cutting machine table, the drive module drives the Z-axis screw rod to adjust the height of the end of the second cutting machine table close to the first cutting machine table, the cutting apparatus is used for cutting the large substrate to be cut to obtain a finished substrate, and the grabbing apparatus is used for transferring the finished substrate obtained by cutting to a specified position.

Relative to the solution of directly moving the second cutting machine table horizontally after the cutting to be driven away from the first cutting machine table and transferred to a specified position with the grabbing apparatus, the present application adopts the step of driving and lifting the second cutting machine table according to a preset parameter to enable a driving-away height difference to be formed between the first cutting machine table and the second cutting machine table, particularly, the driving-away height difference enables a height difference to be formed between the large substrate on the first cutting machine table and the finished substrate departing from the large substrate and falling on the second cutting machine table, which avoids contacts between the substrates and results in completely split at the cutting position, solving the problem of quality abnormality caused by directly driving the substrate away without sufficient cutting penetration of the cutting apparatus, thus improving the quality of the finished substrate.

BRIEF DESCRIPTION OF DRAWINGS

The accompanying drawings, which are included to provide a further understanding of embodiments of the present application and constitute a part of the specification, illustrate embodiments of the application and, together with the text description, explain the principles of the application. Obviously, the drawings in the following description are merely some embodiments of the present application, and those skilled in the art can obtain other drawings according to the drawings without any inventive labor. In the drawings.

DETAILED DESCRIPTION OF EMBODIMENTS

It should be understood that the terminology, specific structural and functional details disclosed are merely exemplary for the purpose of describing specific embodiments. However, the present application may be embodied in many alternative forms and should not be construed as being limited to the embodiments set forth herein.

In the description of the present application, the terms "first" and "second" are only for the purpose of description and cannot be construed to indicate relative importance or imply an indication of the number of technical features indicated. Therefore, unless otherwise stated, a feature defined as "first" and "second" may explicitly or implicitly include one or more of the features; "multiple" means two or more. The term "include" and any variations thereof are intended to be inclusive in a non-closed manner, that is, the presence or addition of one or more other features, integers, steps, operations, units, components and/or combinations thereof may be possible.

In addition, the terms "center", "transverse", "up", "down", "left" "right", "vertical", "horizontal", "top". "bottom". "inner", "outer" and the like for indicating an orientation or positional relationship are based on the description of the orientation or relative positional relationship shown in the accompanying drawings, and are only simplified description facilitating description of the application, and are not intended to indicate that the device or element referred to must have a particular orientation or be configured and operated in a particular orientation, and therefore cannot be construed as limiting the present application.

In addition, unless expressly specified and defined otherwise, the terms "mount", "attach" and "connect" are to be understood broadly. For example, it can be a fixed connection, a detachable connection, or an integral connection; it can be either a mechanical connection or an electrical connection; it can be a direct connection or an indirect connection through an intermediate medium, or an internal connection between two elements. For those skilled in the art, the specific meaning of the above terms in the present application can be understood according to specific circumstances.

Figure 1:
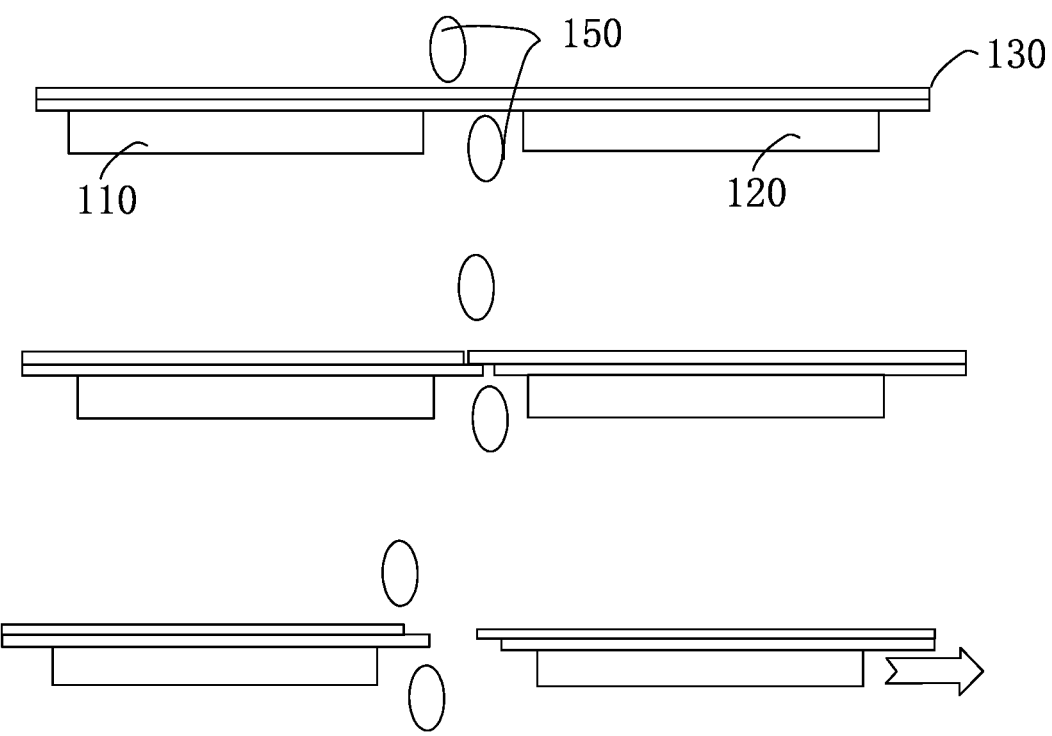
FIG. 1 is a diagram of a cutting process of a cutting machine table for cutting a substrate.

FIG. 1 is a diagram illustrating an undisclosed cutting process for cutting a large substrate 130 known to the applicants, where a fixed structure (not shown) for fixing the large substrate 130 to be cut is correspondingly disposed on a first cutting machine table 110, when the large substrate to be cut is transferred to a cutting machine table 100 and correspondingly disposed on the first cutting machine table 110 and a second cutting machine table 120, a cutting apparatus 150 presses down to cut the large substrate 130 to obtain a finished substrate 130 disposed on the second cutting machine table 120. The finished substrate 130 includes two layers of glass substrates, and generally, the upper layer glass substrate of the finished substrate disposed on the second cutting machine 120 protrudes relative to the lower layer glass substrate after the cutting.

The applicants have found that if the second cutting machine table 120 is directly moved horizontally to be driven away from the first cutting machine table 110 and transferred to a specified position with the grabbing apparatus 160, the finished substrate 130 may be partially adhered to the main body of the large substrate due to insufficient penetration during cutting, which may cause problems such as incomplete splitting, even breakdown, and abnormality of the quality of the finished substrate. Specifically, if the large substrate on the first cutting machine 110 and the second cutting machine 120 is cut in a flat state, the range of the cutter pressure is narrow, and the fault tolerance rate is low. In addition, the lower side surface of the upper layer glass substrate is generally provided with structures of metal routes and the like, and if the structures of metal routes and the like are horizontally driven away from each other, it may cause the structures of metal routes and the like of the end close to the first cutting machine table 110 to be subject to a force, thereby leading to problems such as breaking and scratching.

The applicants improve the solution as follows:

The present application will now be described in details by reference to the accompanying drawings and optional embodiments.

Figure 2:
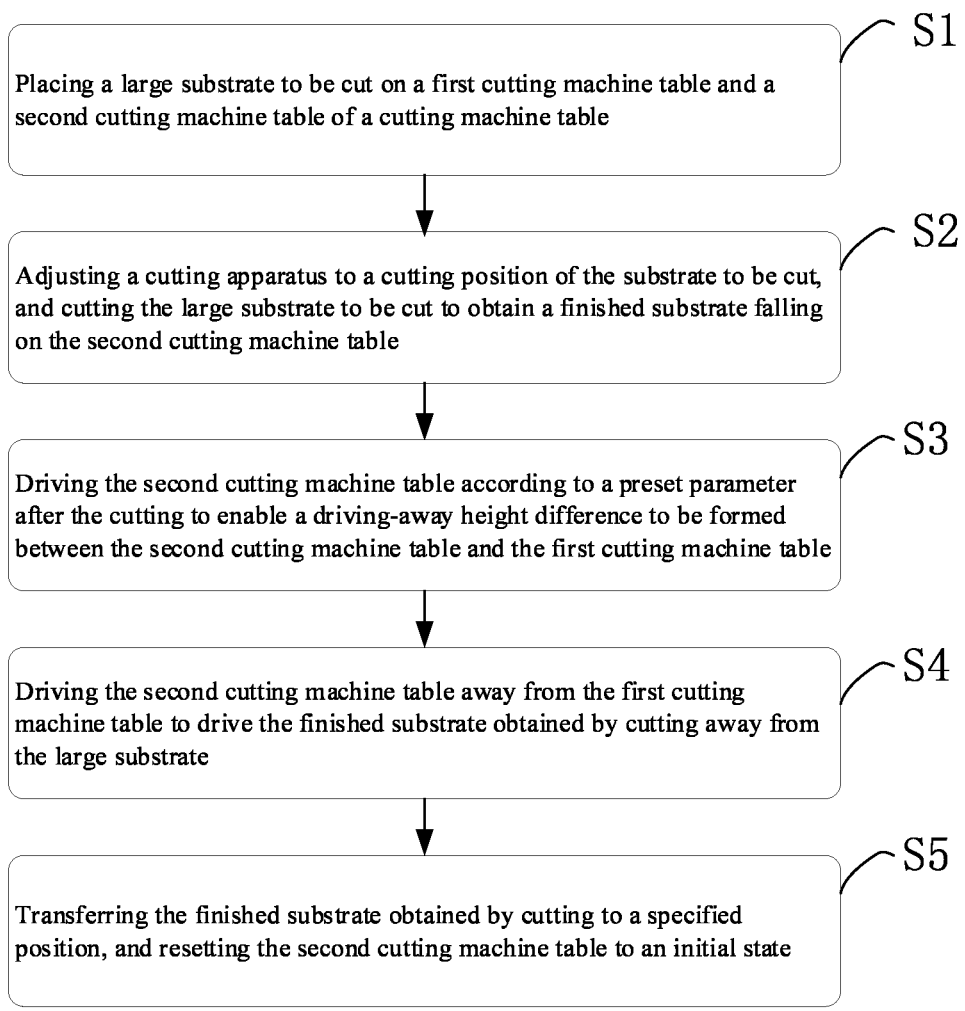
FIG. 2 is a flowchart of a cutting method for cutting a substrate according to an embodiment of the present application.

FIG. 2 is a flowchart of a cutting method for cutting a substrate according to an embodiment of the present application, and discloses a cutting method for cutting a substrate, including following steps:

S1: placing a large substrate to be cut on a first cutting machine table and a second cutting machine table of a cutting machine table;

S2: adjusting a cutting apparatus to a cutting position of the substrate to be cut, and cutting the large substrate to be cut to obtain a finished substrate falling on the second cutting machine table;

S3: driving the second cutting machine table according to a preset parameter after the cutting to enable a driving-away height difference to be formed between the second cutting machine table and the first cutting machine table;

S4: driving the second cutting machine table away from the first cutting machine table to drive the finished substrate obtained by cutting away from the large substrate; and S5: transferring the finished substrate obtained by cutting to a specified position, and resetting the second cutting machine table to an initial state.

Relative to the solution of directly moving the second cutting machine table 120 horizontally after the cutting to be driven away from the first cutting machine table 110 and transferred to a specified position with the grabbing apparatus, the present application adopts the step of driving and lifting the second cutting machine table 120 according to a preset parameter to enable a driving-away height difference to be formed between the first cutting machine table 110 and the second cutting machine table 120, particularly, the driving-away height difference enables a height difference to be formed between the large substrate on the first cutting machine table 110 and the finished substrate 130 departing from the large substrate 130 and falling on the second cutting machine table 120 for performing the splitting action, which results in completely split at the cutting position, solving the problem of quality abnormality caused by directly driving the substrate away without sufficient cutting penetration of the cutting apparatus 150, thus improving the quality of the finished substrate 130.

Figure 3:
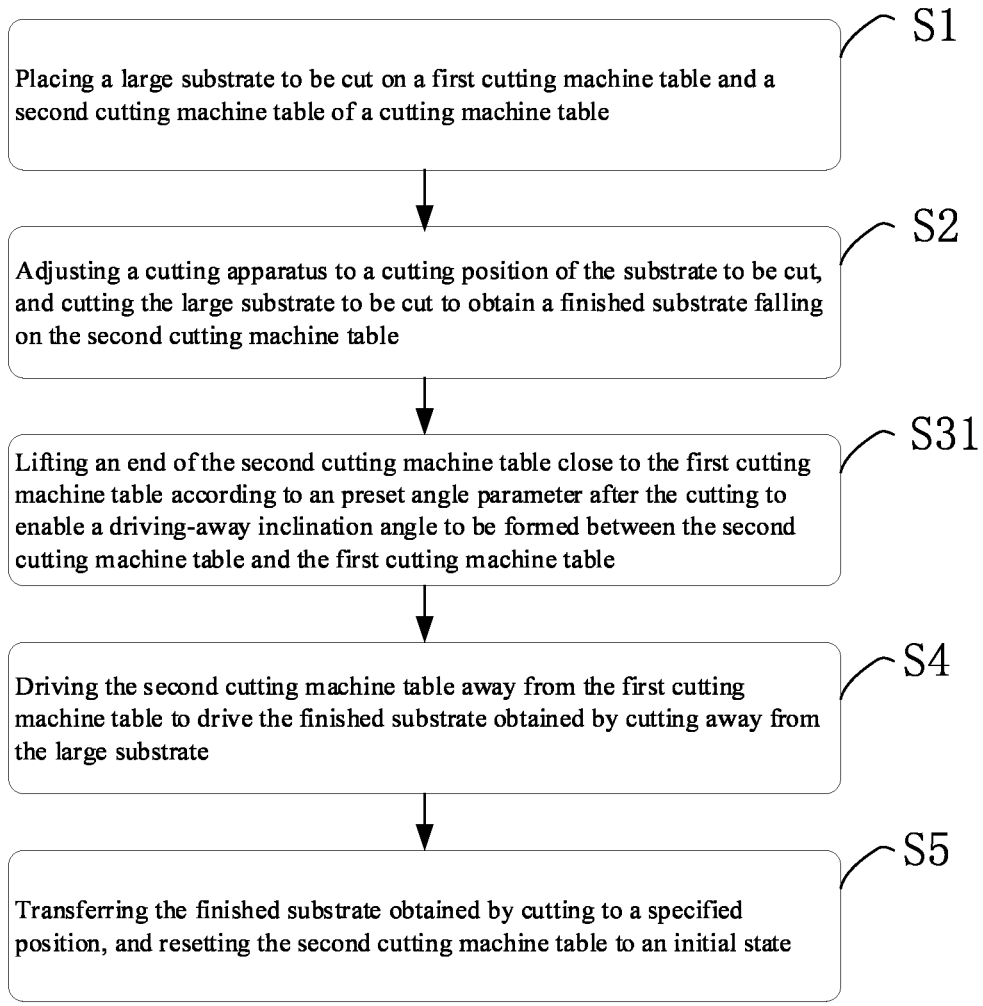
FIG. 3 is a flowchart of a cutting method for cutting a substrate according to another embodiment of the present application.

Specifically, the preset parameter is a height for lifting the second cutting machine table and is adjustable according to different properties and types of the substrate to be cut, and the driving-away height difference is also formed by: lifting one end of the second cutting machine table, or the entirety of the second cutting machine table, specifically as follows:

FIG. 3 is a flowchart of a cutting method for cutting a substrate, and referring to FIG. 3 in conjunction with FIG. 2, in particular, the step S3 includes the process of:

S31: lifting an end of the second cutting machine table close to the first cutting machine table according to an angle parameter after the cutting to enable a driving-away inclination angle to be formed between the second cutting machine table and the first cutting machine table.

The preset parameter includes an angle parameter, the setting of the angle parameter is equivalent to the setting of the driving-away inclination angle, which specifically is lifting the end of the second cutting machine table 120 close to the first cutting machine table 110, so that the splitting of the glass substrate between the finished substrate 130 and the large substrate 130 will be complete due to the driving-away inclination angle, solving the problem of insufficient cutting penetration, and the metal routes on the surfaces of the two substrates can be split in advance, so that when the second cutting machine table 120 is driven away from the first cutting machine table 110, the problems such as scratching damage and the like caused by horizontal driving-away of the metal routes directly may be solved.

Also, the driving-away height difference may be formed by other methods, and the steps of S3 includes:

lifting the entirety of the second cutting machine table by lifting the two ends thereof according to the preset angle parameter after the cutting to form a driving-away height difference.

The entirety of the second cutting machine table 120 is lifted, and the entirety is driven away by the height difference, so that the finished substrate 130 is split more thoroughly, which improves the quality of the finished substrate 130.

Figure 4:
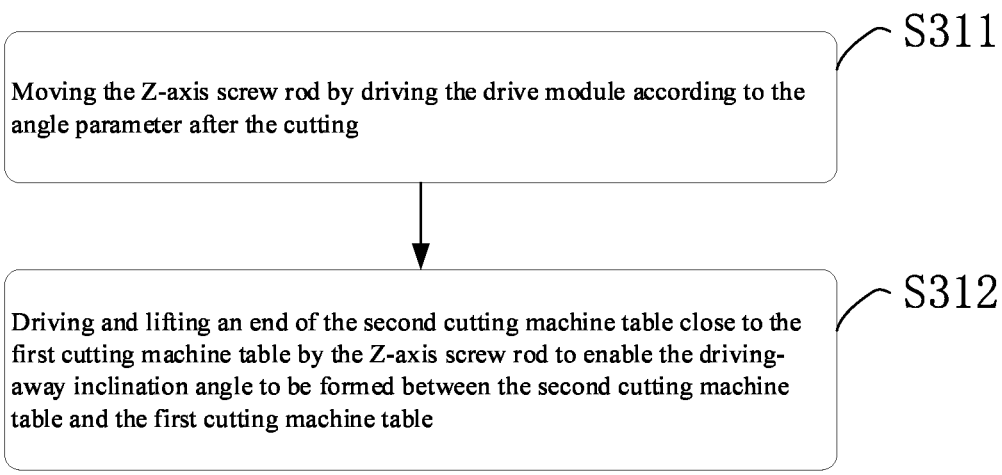
FIG. 4 is a flowchart of a cutting method for cutting a substrate according to yet another embodiment of the present application.

FIG. 4 is a flowchart of a cutting method for cutting a substrate, where the flowchart shown in FIG. 4 is one of the methods of forming a driving-away inclination angle in the flowchart shown in FIG. 3, and in particular, the cutting machine table includes a driving apparatus for driving the second cutting machine table to be inclined; the driving apparatus includes a Z-axis screw rod and a drive module for driving the Z-axis screw rod to move, and the Z-axis screw rod is arranged on the lower side of the second cutting machine table;

The steps of S31 includes:

S311: moving the Z-axis screw rod by driving the drive module according to the angle parameter after the cutting;

S312: driving the second cutting machine table to move by the Z-axis screw rod, to enable the driving-away inclination angle to be formed between the second cutting machine table and the first cutting machine table.

The Z-axis screw rod is in contact with the second cutting machine table to form a contact point;

the distance between the contact point and the end of the second cutting machine table 120 close to the first cutting machine table 110 is d1, and the distance between the contact point and one end of the second cutting machine table 120 far away from the first cutting machine table 110 is d2, where d1:d2=1:3. The Z-axis screw rod 141 is driven by the drive module 142 from the lower portion of the second cutting machine table 120 to move upward or downward, so that according to the preset angle parameter, the end of the second cutting machine table 120 close to the first cutting machine table 110 can be driven to lift, to enable a desirable driving-away angle difference between the second cutting machine table 120 and the first cutting machine table 110 which facilitates subsequent driving-away operation; and the fact that d1:d2=1:3 leaves enough space for the cutter holder to travel and the residue removing mechanism as well as the residual material for cutting while the end of the second cutting machine table 120 close to the first cutting machine table 110 being lifted.

In addition, because the factors of different product properties (glass size, thickness, material, glass terminal width, even different types of cutting wheels for cutting) all affect the splitting degree, the driving of drive module 142 can set different driving-away inclination angles depending on the large substrates to be cut with different sizes, and meanwhile, if the effect of the driving-away inclination angle adjusted once is not desirable for one large substrate 130, the driving-away inclination angle can be adjusted repeatedly until it meets various conditions.

Figure 5:
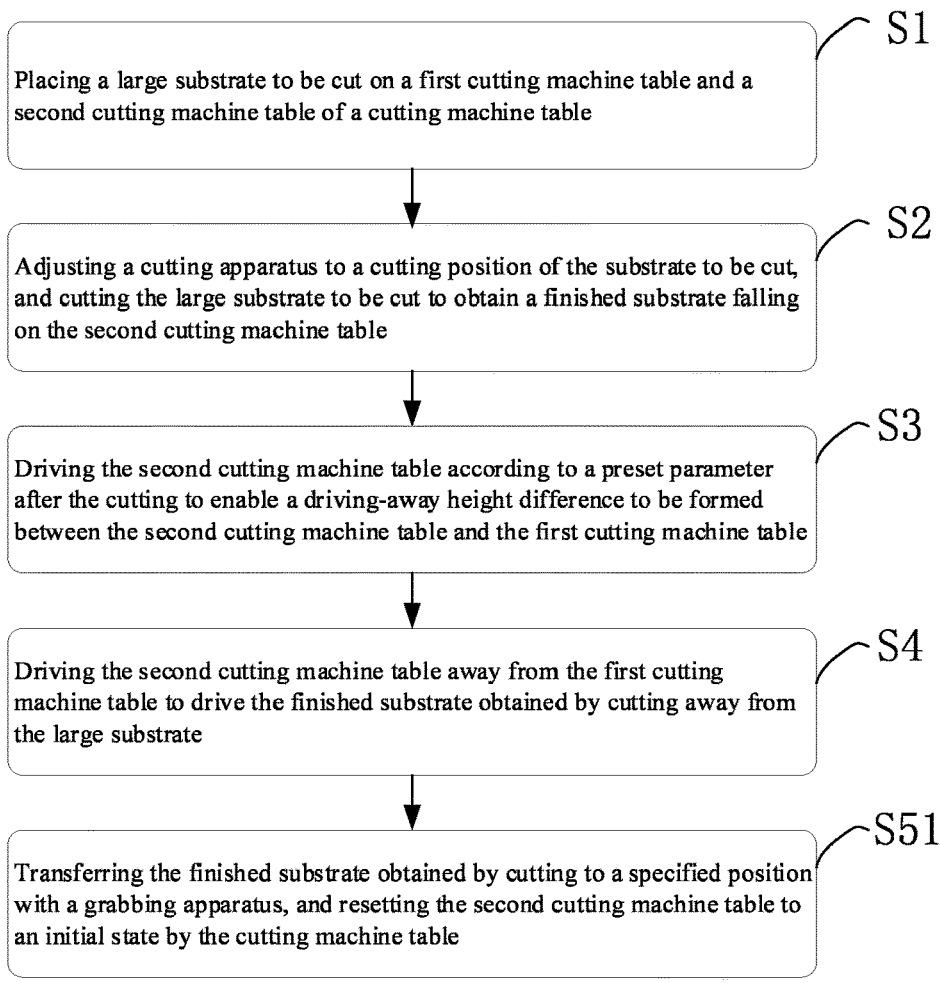
FIG. 5 is a flowchart of a cutting method for cutting a substrate according to a further embodiment of the present application.

FIG. 5 is a flowchart of a cutting method for cutting a substrate; specifically, as shown in FIG. 5, the cutting machine table includes a grabbing apparatus;

the step of transferring the finished substrate obtained by cutting to a specified position and resetting the second cutting machine table includes following steps:

S51: transferring the finished substrate obtained by cutting to a specified position with a grabbing apparatus, and resetting the second cutting machine table to an initial state by the cutting machine table;

and the driving-away inclination angle matches a grabbing angle of the grabbing apparatus. The grabbing apparatus 160 may include a mechanical arm and the like, and the driving apparatus drives the second cutting machine table 120 to form a preset inclination angle; because the substrate is taken away by the mechanical arm after the driving-away, the taking-away may be impacted by the levelness of the glass substrate, the leading-out angle should met the levelness requirement of the angle at which the arm taking the substrate, therefore the driving-away inclination angle is provided to be matched with the grabbing angle of the grabbing apparatus, so that the problem of insufficient splitting may be solved, the grabbing angle is prevented from being directly adjusted, and substantial extra cost for adjusting the grabbing apparatus is saved, solving the problem that the grabbing angle needs to be adjusted for many times when the large substrates 130 with different sizes are grabbed or the finished substrate 130 is directly scratched, thus improving the efficiency by avoiding to adjust the grabbing angle of the grabbing apparatus 160 does when the grabbing apparatus 160 grabs the large substrates with different sizes; and then, the second cutting machine table is reset to the initial state by the cutting machine table 100, so that the subsequent cutting operation can be facilitated.

Figure 6:
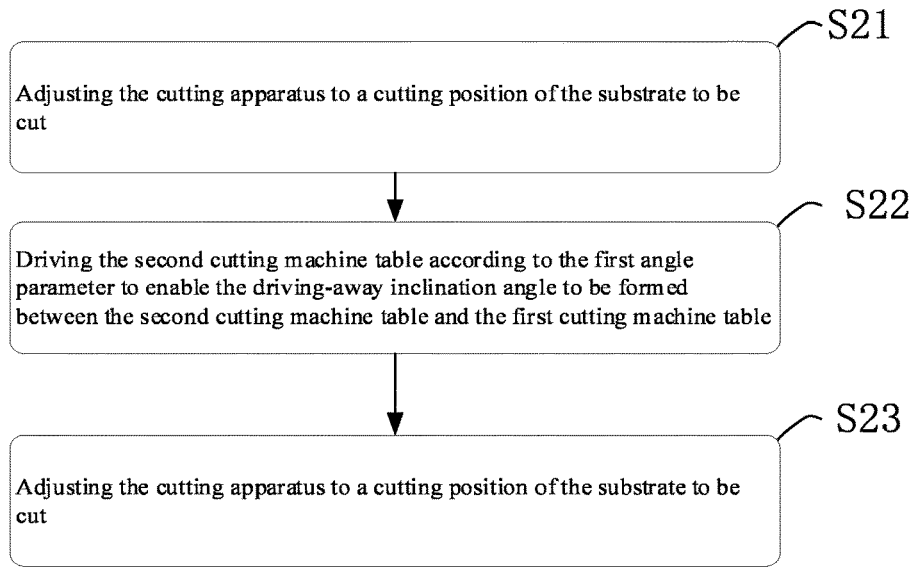
FIG. 6 is a flowchart of cutting steps in a cutting method according to an embodiment of the present application.

FIG. 6 is a flowchart of the cutting steps in a cutting method according to an embodiment of the present application, and referring to FIG. 6 in conjunction with FIGS. 2 and 3, in order to better improve the problem of insufficient cutting penetration, the present application further discloses solutions as follows: the steps of S2 may include:

S21: adjusting the cutting apparatus to a cutting position of the substrate to be cut;

S22: driving the second cutting machine table according to the first angle parameter to enable the driving-away inclination angle to be formed between the second cutting machine table and the first cutting machine table;

S23: cutting the large substrate to be cut to obtain the finished substrate falling on the second cutting machine table.

The angle parameter includes a first angle parameter, specifically, the height for adjusting an end of the second cutting machine table close to the first cutting machine table, for example, when the length of the second cutting machine table is 300,000 um, the first angle parameter is an angle for lifting the end of the second cutting machine table close to the first cutting machine table to form a cutting inclination angle before cutting, and the specific lifting height ranges from 1 um to 500 um; that is, the preset cutting inclination angle is set before cutting, so that the part of the large substrate 130 to be cut that is positioned above the second cutting machine table 120 may be slightly apart from the surface of the machine table due to the cutting inclination angle, resulting in that a certain downward self-gravity exists in the part of the large substrate to be cut that is positioned above the second cutting machine table 120, so that the cutting wheel is labor-saving during the cutting, which leads to a complete cutting penetration, reduces the adhesion and other problems, and provides a good splitting basis for the subsequent driving-away operation, thus avoiding partial risks in advance and improving the production efficiency.

Figure 7:
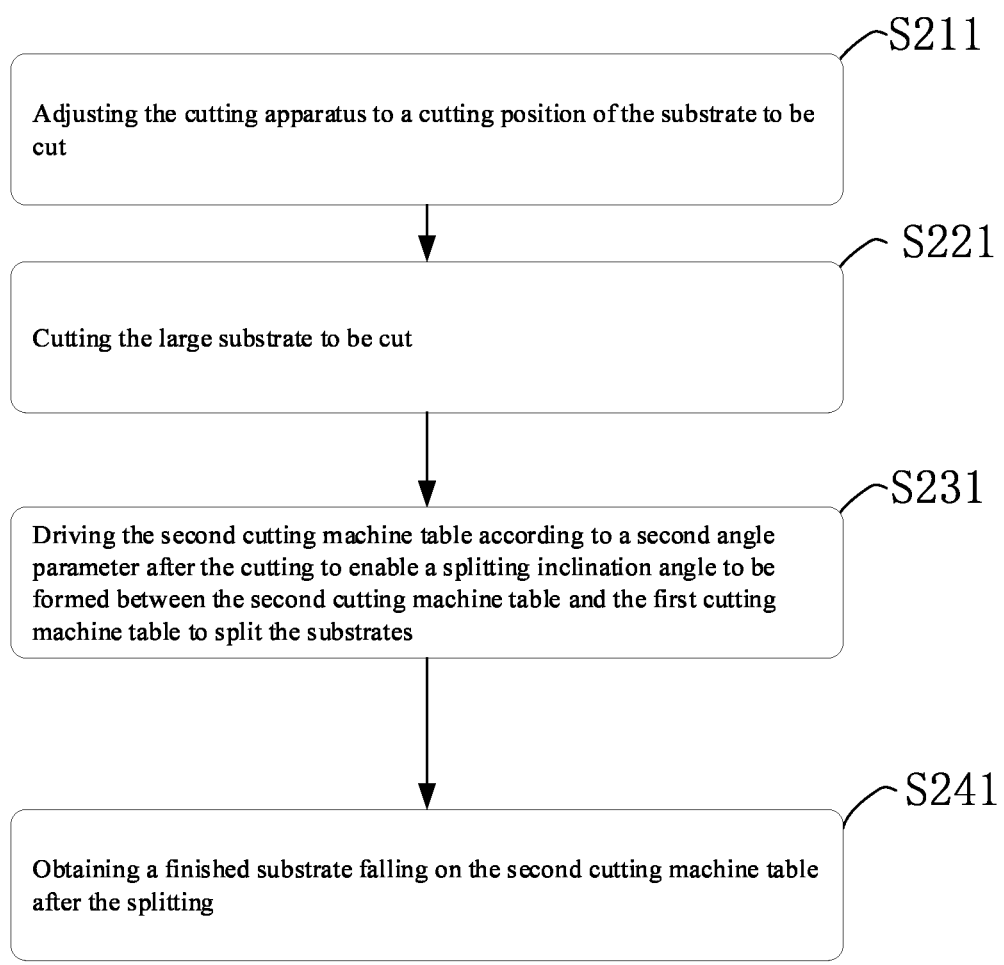
FIG. 7 is a flowchart of splitting steps in a cutting method according to an embodiment of the present application.

FIG. 7 is a flowchart of cutting steps in a cutting method according to an embodiment of the present application, and referring to FIG. 7 in combination with FIGS. 2 and 3, in order to make the splitting more thorough, the following scheme may also be adopted, and the step of S2 may further include:

S211: adjusting the cutting apparatus to a cutting position of the substrate to be cut;

S221: cutting the large substrate to be cut;

S231: driving the second cutting machine table according to a second angle parameter after the cutting to enable a splitting inclination angle to be formed between the second cutting machine table and the first cutting machine table to split the substrates; and S241: obtaining a finished substrate falling on the second cutting machine table after the splitting.

The angle parameter further includes a second angle parameter, and the second angle parameter is an angle for lifting the end of the second cutting machine table close to the first cutting machine table to form a splitting inclination angle in the splitting stage, specifically, for example, when the length of the second cutting machine table is 300,000 um, the lifting height ranges from 300 um to 500 um; that is, the splitting inclination angle brings about additional splitting effects at the cutting position between the large substrate on the first cutting machine table and the finished substrate 130 falling on the second cutting machine table 120 after the cutting due to factors such as self-gravity and the like, which solves the problem of insufficient cutting penetration in the cutting stage.

Figure 8:
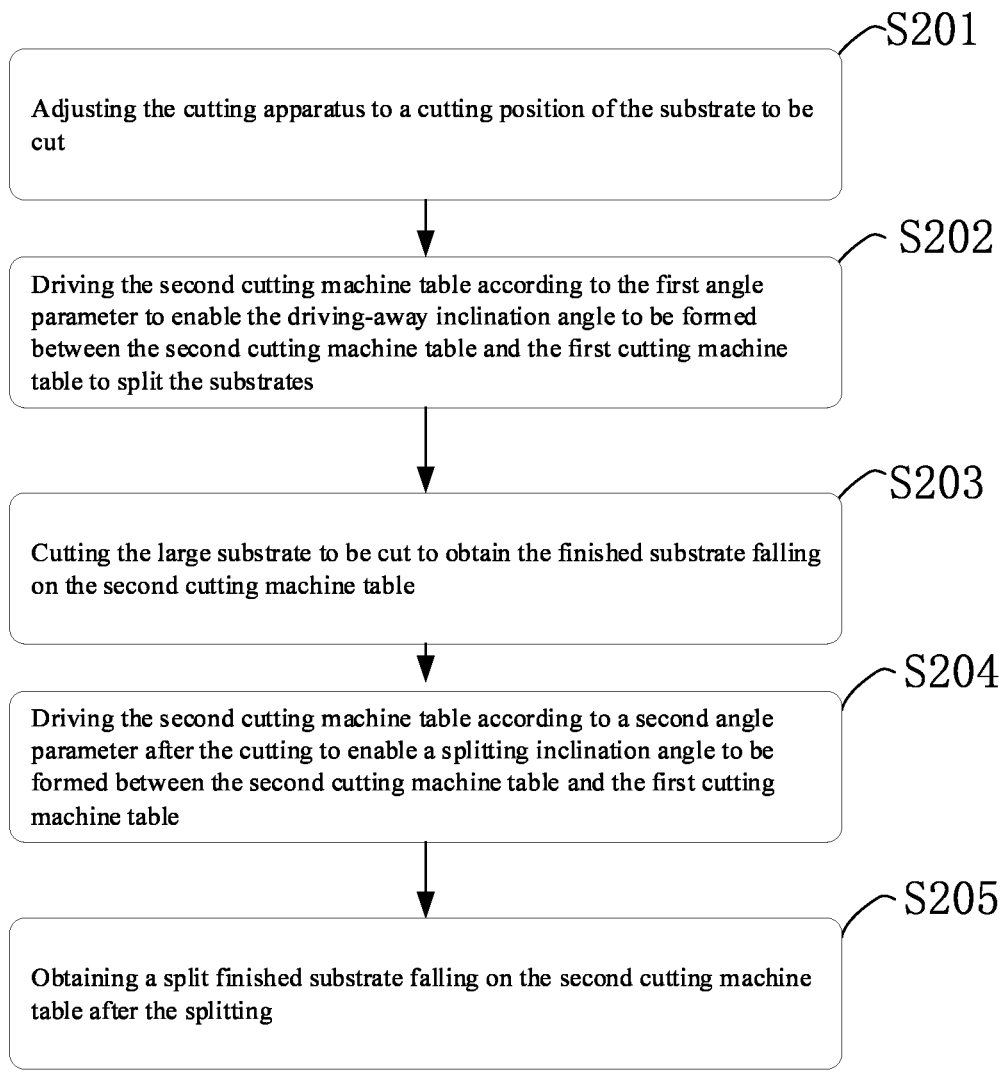
FIG. 8 is a flowchart of the cutting and splitting steps in a cutting method according to an embodiment of the present application.

FIG. 8 is a flowchart of the cutting and splitting steps in a cutting method according to an embodiment of the present application, and FIG. 8 shows a further modification of FIGS. 6 and 7, specifically, the steps of S2 include:

S201: adjusting the cutting apparatus to a cutting position of the substrate to be cut;

S202: driving the second cutting machine table according to the first angle parameter to enable the driving-away inclination angle to be formed between the second cutting machine table and the first cutting machine table to split the substrates;

S203: cutting the large substrate to be cut to obtain the finished substrate falling on the second cutting machine table;

S204: driving the second cutting machine table according to a second angle parameter after the cutting to enable a splitting inclination angle to be formed between the second cutting machine table, and the first cutting machine table; and S205: obtaining a split finished substrate falling on the second cutting machine table after the splitting.

Before cutting, the second cutting machine table 120 is driven to form a cutting inclination angle with the first cutting machine table 110 to improve the problem of insufficient cutting penetration, and after the cutting, the second cutting machine table 120 is driven to form a splitting inclination angle with the first cutting machine table 110, so that an additional splitting effect is generated between the two substrates 130, which improves the problem of insufficient splitting.

Specifically, the distance between the end of the second cutting machine table far away from the first cutting machine table and the end of the second cutting machine table close to the first cutting machine table is A;

the step of driving the second cutting machine table according to the angle parameter after the cutting to enable the driving-away inclination angle to be formed between the second cutting machine table and the first cutting machine table includes:

driving to lift the end of the second cutting machine table 120 close to the first cutting machine table 110 according to the angle parameter, where the lifting height ranges from A/300,000 to A/300, so that the driving-away inclination angle is formed between the second cutting machine table 120 and the first cutting machine table 110; taking A=300,000 um as an example, the lifting height ranges from 30 um to 1,000 um to form a driving-away inclination angle, and the specific lifting height can be adaptively adjustable according to factors such as the size and material of the large substrate 130 to be cut.

Figure 9:
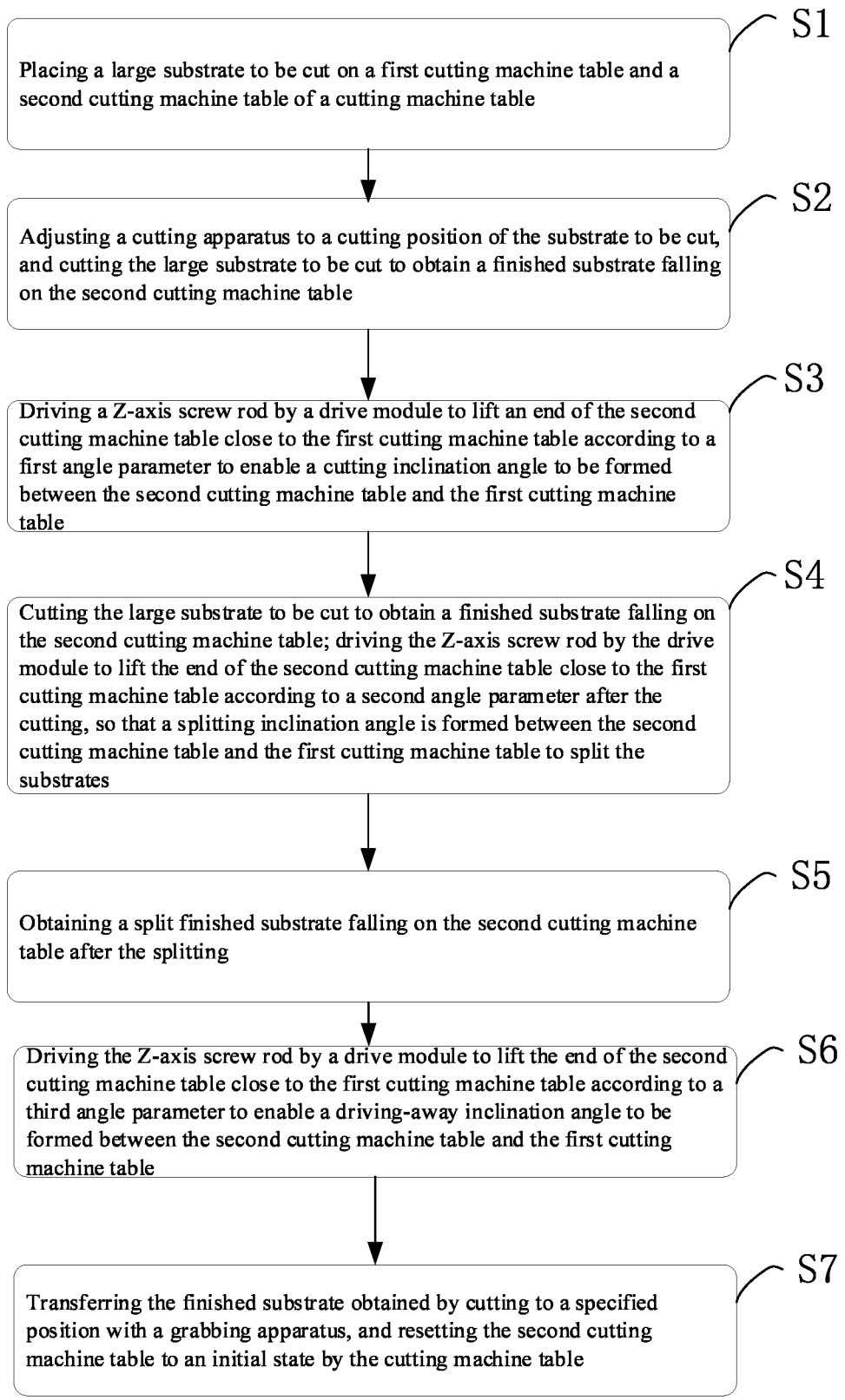
FIG. 9 is a flowchart of a cutting method for cutting a substrate according to another embodiment of the present application.

FIG. 9 is a flowchart of a cutting method for cutting a substrate according to yet another embodiment, and as shown in FIG. 9, a cutting method for cutting a substrate is disclosed as another embodiment of the present application; the method includes following steps:

S1: placing a large substrate to be cut on a first cutting machine table and a second cutting machine table of a cutting machine table;

S2: adjusting a cutting apparatus to a cutting position of the substrate to be cut corresponding to the position between the first cutting machine table and the second cutting machine table;

S3: driving a Z-axis screw rod by a drive module to lift an end of the second cutting machine table close to the first cutting machine table according to a first angle parameter to enable a cutting inclination angle to be formed between the second cutting machine table and the first cutting machine table;

S4: cutting the large substrate to be cut to obtain a finished substrate falling on the second cutting machine table; driving the Z-axis screw rod by the drive module to lift the end of the second cutting machine table close to the first cutting machine table according to a second angle parameter after the cutting, so that a splitting inclination angle is formed between the second cutting machine table and the first cutting machine table to split the substrates;

S5: obtaining a split finished substrate falling on the second cutting machine table after the splitting;

S6: driving the Z-axis screw rod by a drive module to lift the end of the second cutting machine table close to the first cutting machine table according to a third angle parameter to enable a driving-away inclination angle to be formed between the second cutting machine table and the first cutting machine table; and S7: transferring the finished substrate obtained by cutting to a specified position with a grabbing apparatus, and resetting the second cutting machine table to an initial state by the cutting machine table.

The cutting inclination angle is smaller than the splitting inclination angle and the driving-away inclination angle;

the Z-axis screw rod 141 is in contact with the second cutting machine table 120 to form a contact point; the distance between the contact point and the end of the second cutting machine table 120 close to the first cutting machine table 110 is d1, and the distance between the contact point and one end of the second cutting machine table 120 far away from the first cutting machine table 110 is d2, where d1:d2=1:3.

The angle parameter further includes a third angle parameter, for example, when the length of the second cutting machine table 120 is 300,000 um, the first angle parameter is an angle for lifting the end of the second cutting machine table 120 close to the first cutting machine table to form a cutting inclination angle before cutting, and specifically, the lifting height ranges from 1 um to 500 um; the second angle parameter is an angle for lifting the end of the second cutting machine table 120 close to the first cutting machine table 110 to form a splitting inclination angle in the splitting stage, and specifically, the lifting height ranges from 300 um to 500 um; similarly, the third angle parameter is an angle for lifting the end of the second cutting machine table 120 close to the first cutting machine table 110 to form an driving-away inclination angle when the second cutting machine table 120 is driven to be far away from the first cutting machine table 110, and specifically, the lifting height ranges from 500 um to 1000 um. And when the second cutting machine table 120 is different and the material and the thickness of the substrate are different, the specific lifting height may be adjusted according to actual conditions. All such modifications are intended to be included within the scope of this application. Before cutting, the second cutting machine table 120 is driven to form a cutting inclination angle with the first cutting machine table 110 to solve the problem of insufficient cutting penetration, the second cutting machine table 120 is driven to form a splitting inclination angle with the first cutting machine table 110, so that an additional splitting effect occurs between the two substrates to solve the problem of insufficient splitting, and then, the second cutting machine table 120 is driven to form a driving-away inclination angle with the first cutting machine table 110, so that additional splitting occurs between the two substrates again to make the splitting complete, meanwhile, the driving-away inclination angle is adjusted so as to be matched with the grabbing angle of the grabbing apparatus, specifically, the cutting inclination angle is smaller than the splitting inclination angle and the driving-away inclination angle, at the same time, the substrate is easier to cut, and the substrate falling on the second cutting machine table 120 after the cutting will not be scratched instantaneously due to the large-angle inclination, which improves the quality.

Figure 10:
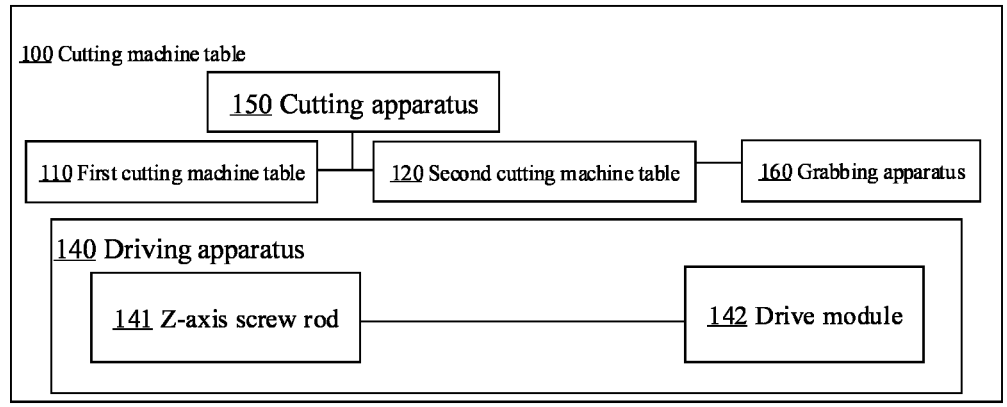
FIG. 10 is a schematic block diagram of a cutting machine table according to another embodiment of the present application.
Figure 11:
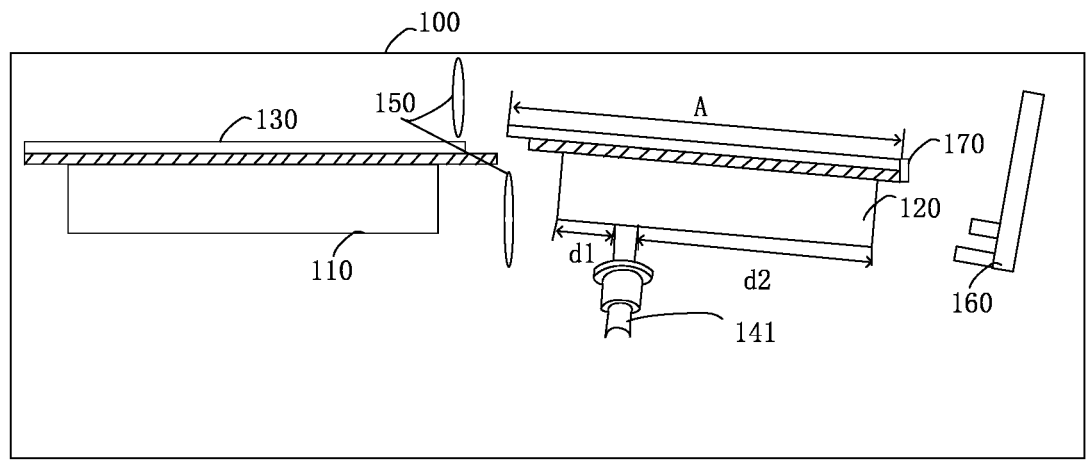
FIG. 11 is a cross-sectional view of a cutting machine table according to another embodiment of the present application.

FIG. 10 is a schematic block diagram of a cutting machine table according to another embodiment of the present application, and FIG. 11 is a cross-sectional view of the cutting machine table according, to another embodiment of the present application, which discloses a cutting machine table used for the cutting method of a cutting machine table described above as another embodiment of the present application. The cutting machine table 100 includes:

a first cutting machine table 110, a second cutting machine table 120, a driving apparatus 140, a cutting apparatus 150 and a grabbing apparatus 160, where the second cutting machine table 120 is aligned with the first cutting machine table 110, and the first cutting machine table 110 and the second cutting machine table 120 are used for supporting a substrate 130 to be cut. When in an initial state, the second cutting machine table 120 is horizontally aligned with the first cutting machine table 110, the driving apparatus 140 includes a Z-axis screw rod 141 and a drive module 142, the Z-axis screw rod 141 is arranged below an end of the second cutting machine table 120 close to the first cutting machine table 110, the drive module 142 drives the Z-axis screw rod 141 to adjust the height of the end of the second cutting machine table 120 close to the first cutting machine table 110, the cutting apparatus 150 is used for cutting the large substrate 130 to be cut to obtain a finished substrate 130, and the grabbing apparatus 160 is used for transferring the finished substrate 130 obtained by cutting to a specified position. The drive module 142 includes a servo motor and the like; in addition, two Z-axis screws 141 may be symmetrically disposed on two sides of the end of the second cutting machine table 120 close to the first cutting machine table 110, and the two Z-axis screws 141 are lifted synchronously to ensure a balanced and uniform lifting. A stop 170 is disposed at the end of the second cutting machine table 120 far away from the first cutting machine table 110, which avoids conditions such as falling and damage and the like to occur when the Z-axis screw rod 141 lifts the end of the second cutting machine table 120 close to the first cutting machine table 110 too high due to an error, a fault, a poor operation and the like.

It should be noted that, the limitation of the steps involved in this solution, without affecting the implementation of the specific solution, is not determined to limit the sequence of steps, and the previous steps may be executed first, later, or even simultaneously; different embodiments that may be combined as long as they do not conflict with each other shall be deemed to fall within the scope of the present application as long as the solution can be implemented.

The technical solution of the present application can be applied to a wide variety of display panels, such as Twisted Nematic (TN) display panels, In-Plane Switching (IPS) display panels, Vertical Alignment (VA) display panels, Multi-Domain Vertical Alignment (MVA) display panels, and other types of display panels, such as Organic Light-Emitting Diode (OLED) display panels.

The above content is a further detailed description of the present application in conjunction with specific optional embodiments, and it is not to be construed that specific embodiments of the present application are limited to these descriptions. For those of ordinary skill in the art to which the present application belongs, a number of simple derivations or substitutions may be made without departing from the spirit of the present application, all of which shall be deemed to fall within the scope of the present application.

What is claimed is:

1. A cutting method for cutting a substrate, comprising steps of:
   placing a primary substrate to be cut on a first cutting machine table and a second cutting machine table of a cutting machine table;
   adjusting a cutting apparatus to a cutting position of the primary substrate to be cut, and cutting the primary substrate to be cut to obtain a finished substrate placed on the second cutting machine table; wherein the cutting apparatus comprises two cutters, one of which is arranged above the primary substrate and is used to cut an upper side of the primary substrate along a first cutting line, and another of which is arranged below the primary substrate and is used to cut a lower side of the primary substrate along a second cutting line, wherein the first cutting line and the second cutting line are misaligned in a direction perpendicular to the upper and lower sides of the primary substrate; wherein the upper side and the lower side of the primary substrate are cut simultaneously;
   driving the second cutting machine table according to a preset parameter after the cutting to enable a driving-away height difference to be formed between the second cutting machine table and the first cutting machine table;
   driving the second cutting machine table away from the first cutting machine table in a horizontal direction to drive the finished substrate obtained by cutting away from the primary substrate; and
   transferring the finished substrate obtained by cutting to a specified position, and resetting the second cutting machine table to an initial state;
   wherein the step of driving the second cutting machine table according to the preset parameter after the cutting to enable the driving-away height difference to be formed between the second cutting machine table and the first cutting machine table comprises: lifting an end of the second cutting machine table adjacent to the first cutting machine table according to an angle parameter after the cutting to enable a driving-away inclination angle to be formed between the second cutting machine table and the first cutting machine table;
   wherein the cutting machine table comprises a driving apparatus for driving the second cutting machine table to be inclined, the driving apparatus comprises a Z-axis screw rod and a drive module for driving the Z-axis screw rod to move, and the Z-axis screw rod is arranged on the lower side of the second cutting machine table;
   wherein the step of driving the second cutting machine table according to the angle parameter after the cutting to enable the driving-away inclination angle to be formed between the second cutting machine table and the first cutting machine table comprises: moving the Z-axis screw rod by driving the drive module according to the angle parameter after the cutting; and driving and lifting the end of the second cutting machine table adjacent to the first cutting machine table by the Z-axis screw rod to enable the driving-away inclination angle to be formed between the second cutting machine table and the first cutting machine table, wherein the end of the second cutting machine table adjacent to the first cutting machine table is lifted to be higher than the first cutting machine table and than remaining portions of the second cutting machine table.

2. The cutting method for cutting the substrate according to claim 1, wherein the step of adjusting the cutting apparatus to a cutting position of the substrate to be cut and cutting the large substrate to be cut to obtain a finished substrate falling on the second cutting machine table comprises:
   adjusting the cutting apparatus to a cutting position of the substrate to be cut;
   adjusting the height of an end of the second cutting machine table close to the first cutting machine table according to a first angle parameter to enable a cutting inclination angle to be formed between the second cutting machine table and the first cutting machine table; and
   cutting the large substrate to be cut to obtain the finished substrate falling on the second cutting machine table.

3. The cutting method for cutting the substrate according to claim 2, wherein the first angle parameter is an angle for lifting the end of the second cutting machine table close to the first cutting machine table to form a cutting inclination angle before the cutting, and the lifting height ranges from 1 um to 500 um when the length of the second cutting machine table is 300,000 um.

4. The cutting method for cutting the substrate according to claim 1, further comprising, after the step of adjusting the cutting apparatus to a cutting position of the substrate to be cut and cutting the large substrate to be cut to obtain a finished substrate falling on the second cutting machine table:
   adjusting the height of an end of the second cutting machine table close to the first cutting machine table according to a second angle parameter to enable a splitting inclination angle to be formed between the second cutting machine table and the first cutting machine table to split the substrates; and
   obtaining a split finished substrate falling on the second cutting machine table after the splitting.

5. The cutting method for cutting the substrate according to claim 4, wherein the second angle parameter is an angle for lifting the end of the second cutting machine table close to the first cutting machine table to form a splitting inclination angle during the splitting stage, and the lifting height ranges from 300 um to 500 um when the length of the second cutting machine table is 300,000 um.

6. The cutting method for cutting the substrate according to claim 1, wherein the driving of the drive module can set different driving-away inclination angles based on different sizes of the primary substrates to be cut.

7. The cutting method for cutting the substrate according to claim 1, wherein the cutting machine table comprises a grabbing apparatus;
the step of transferring the finished substrate obtained by cutting to a specified position and resetting the second cutting machine table to an initial state comprises following process:
transferring the finished substrate obtained by cutting to the specified position with the grabbing apparatus; and
resetting the second cutting machine table to the initial state by the cutting machine table;
wherein the driving-away inclination angle matches a grabbing angle of the grabbing apparatus.

8. The cutting method for cutting the substrate according to claim 1, wherein the Z-axis screw rod is in contact with the second cutting machine table to form a contact point;
the distance between the contact point and the end of the second cutting machine table close to the first cutting machine table is d1, and the distance between the contact point and one end of the second cutting machine table far away from the first cutting machine table is d2;
wherein d1:d2=1:3.

9. The cutting method for cutting the substrate according to claim 1, wherein the drive module comprises a servo motor.

10. The cutting method for cutting the substrate according to claim 1, wherein the distance between an end of the second cutting machine table far away from the first cutting machine table and the end of the second cutting machine table close to the first cutting machine table is A;
the step of driving the second cutting machine table according to the angle parameter after the cutting to enable the driving-away inclination angle to be formed between the second cutting machine table and the first cutting machine table comprises:
driving to lift the end of the second cutting machine table close to the first cutting machine table according to the angle parameter, wherein the lifting height ranges from A/300,000 to A/300, so that the driving-away inclination angle is formed between the second cutting machine table and the first cutting machine table.

11. The cutting method for cutting the substrate according to claim 1, wherein the finished substrate comprises an upper layer glass substrate and a lower layer glass substrate, and the upper layer glass substrate of the finished substrate located on the second cutting machine table protrudes relative to the lower layer glass substrate after the cutting.

12. The cutting method for cutting the substrate according to claim 1, wherein the preset parameter is a height for lifting the second cutting machine table, and the preset parameter is adjustable according to different properties and types of the substrate to be cut.

13. The cutting method for cutting the substrate according to claim 1, wherein the driving-away height difference is formed by lifting the entirety of the second cutting machine table to be higher than the first cutting machine table.

* * * * *